UNITED STATES PATENT OFFICE.

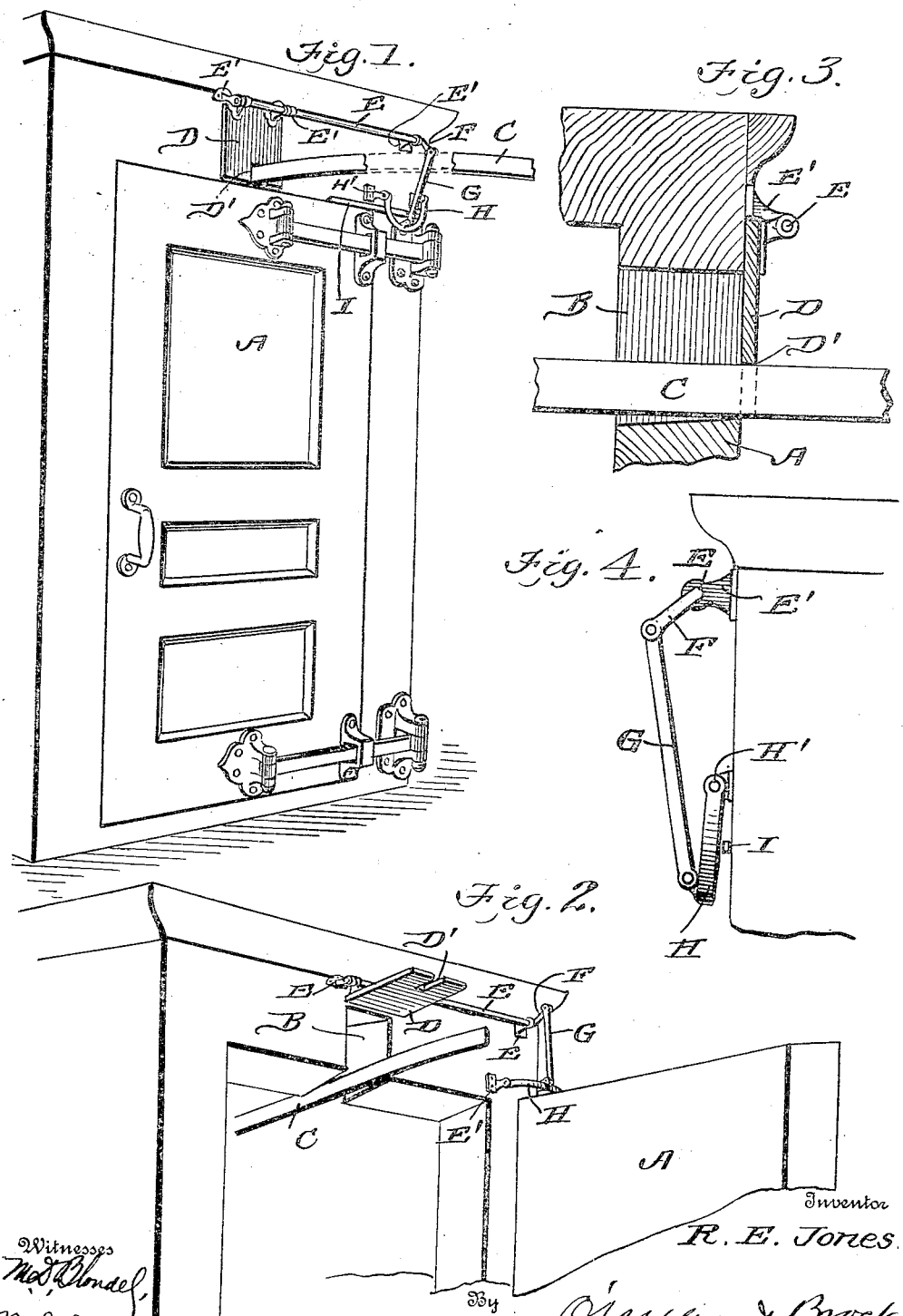

RICHARD E. JONES, OF HAGERSTOWN, MARYLAND.

TRACK-DOOR FOR REFRIGERATORS.

No. 890,772.   Specification of Letters Patent.   Patented June 16, 1908.

Application filed October 15, 1906. Serial No. 339,065.

*To all whom it may concern:*

Be it known that I, RICHARD E. JONES, a citizen of the United States, residing at Hagerstown, in the county of Washington and State of Maryland, have invented a new and useful Improvement in Track-Doors for Refrigerators, of which the following is a specification.

This invention relates generally to refrigerators or cold storage compartments and has for its object to provide a track door for the purpose of closing or sealing the track opening at the top of an ordinary door opening and another object of the invention is to provide for automatically opening and closing the said track door as the main door is opened or closed.

With these objects in view the invention consists essentially in mounting a track door upon a shaft provided with a crank at one end, said crank being operatively connected with a bail which is adapted to raise and lower as the main door is opened or closed thereby opening and closing the track door.

The invention consists also in certain details of construction herein after fully described and pointed out in the claims.

In the drawings forming a part of this specification Figure 1 is a view showing my improved construction of track door and operating means arranged in connection with a refrigerator or cold storage compartment, the main door of the refrigerator or compartment being closed and likewise the track door. Fig. 2 is a detail perspective view showing the main door and track door open. Fig. 3 is a detail sectional view of the track door showing the relative position of said track door with reference to the main door and track, and Fig. 4 is a side or end view of the track door operating means.

Referring to the drawings A indicates the refrigerator door and B a small opening at the top of the door opening and through which passes the track C upon which travels the pulleys carrying the meat hangers. Heretofore these small openings B have always remained opened after the door A has been closed consequently it has been impossible to prevent warm air entering the refrigerator compartment. For the purpose of completely closing this opening B when the door A is closed I provide a track door D which is mounted upon a hinged shaft E which shaft is journaled in brackets E' attached to the face of the refrigerator, and the lower end of this door is slotted as shown at D' in order to fit over the track C. When the door is closed, the slot D' being just wide enough to receive the said bracket and consequently when the track door is turned down from the opening B said opening is completely closed or sealed thereby preventing the entrance of warm air into the refrigerator. It is of course necessary to elevate this track door whenever the track is to be used and inasmuch as this only occurs when the door A is open, I connect the door A and track door D by an operating mechanism so that by opening the main door the track door is automatically elevated and when the main door is closed the track door will close by gravity and at the same time a slight compression within the refrigerator which takes place upon the sudden closing of the door can be relieved by a slight flutter of the track door and the said track door thereby serves a double purpose, mainly as a closer for the track opening and as a vent for the escape of the compressed air.

For the purpose of automatically operating the track door I provide a shaft E with a crank arm F at the end adjacent the hinged end of the door A. Connected to this crank arm F is a rod which in turn is pivotally connected at the lower end to a semi-circular shaped bail H pivoted at H' to brackets secured to the face of the refrigerator and normally this bail hangs downwardly beyond the top line of the door A and secured to the top of the door is a horizontally projecting arm I, upon which the bail H rests and when the door A is thrown open as shown in Fig. 2 this horizontal arm I contacts with the bail, raises it to a horizontal position, and in so doing forces up the rod G by operating upon the crank arm F, turns the shaft E upon which the track door D is mounted and raises the track door as most clearly shown in Fig. 2. When the door A is closed the bail H and the rod G drop by their own weight and consequently the track door falls and closes the opening B but inasmuch as the closing of this door is due entirely to the operation of gravity it is obvious that it can have a slight outward fluttering motion sufficient to permit the escape of the compressed air and this is a very essential feature as there is always more or less compression when ever the door is closed quickly.

It will thus be seen that I provide an exceedingly cheap and simple appliance which effectively closes the track opening at the top of the door opening and also serves as a vent for the escape of compressed air.

Having thus fully described my invention, what I claim as new and desire to secure by Letters Patent, is:—

1. An air tight compartment provided with a main-door opening and a track-door opening, a main door and a track door for closing the respective openings, a shaft upon which the track door is mounted, a swinging bail adapted to be raised by the opening of the main door and means for connecting said bail and shaft, as set forth.

2. The combination with a main door, a track door mounted upon a shaft having a crank-arm at one end, a rod connected to the said crank-arm, and a bail to which the rod is pivoted, said bail being so arranged with reference to the main door that the opening of said main door serves to elevate the bail, as set forth.

3. A main door, a track door slotted as described, a shaft upon which the track door is mounted, said shaft having a crank-arm at one end, a rod connected to said crank-arm, a swinging bail to which the rod is connected, and an elevating arm adapted to be connected to the main door, and for the purpose of elevating the bail when the said main door is opened, as set forth.

RICHARD E. JONES.

Witnesses:
 THOS. H. NEWMAN,
 J. S. NICODEMUS.